Apr. 17, 1923.
I. G. YODERS ET AL
1,451,856
CONNECTOR LINK FOR TIRE CHAINS
Filed March 9, 1922
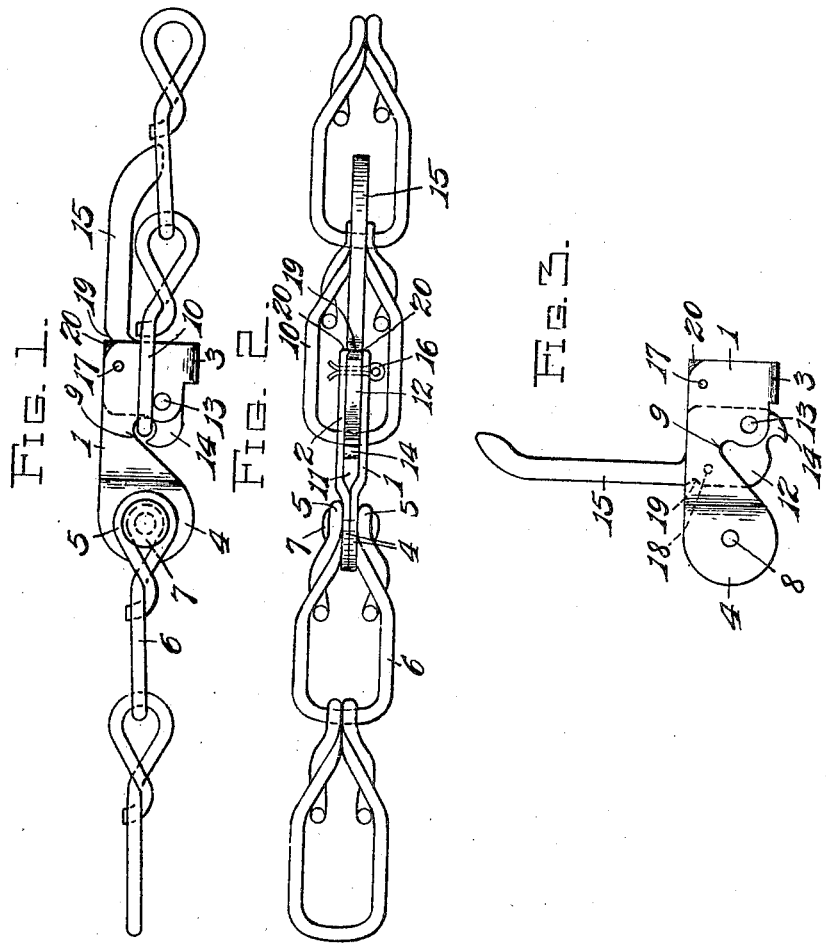
INVENTORS.
Irvin G. Yoders.
James C. Filby
By N. E. Dunlap
ATTORNEY.

Patented Apr. 17, 1923.

1,451,856

UNITED STATES PATENT OFFICE.

IRVIN G. YODERS AND JAMES C. FILBY, OF WASHINGTON, PENNSYLVANIA.

CONNECTOR LINK FOR TIRE CHAINS.

Application filed March 9, 1922. Serial No. 542,428.

*To all whom it may concern:*

Be it known that we, IRVIN G. YODERS and JAMES C. FILBY, citizens of the United States of America, and residents of Washing, county of Washington, and State of Pennsylvania, have invented certain new and useful Improvements in Connector Links for Tire Chains, of which the following is a specification.

This invention relates to a connector link for tire chains, and it has for its principal object to provide a simple, inexpensive and efficient connector for the meeting ends of tire chains, the same having a form which practically insures its retaining closed position, thus effectually guarding against the release and loss of the chain by which it is carried.

In describing the invention in detail, reference is herein had to the accompanying drawings, in which—

Figure 1 is a side elevation of the invention applied in chain connecting position;

Figure 2 is a top plan view of the same; and—

Figure 3 is a side elevation of the connector link, detached, showing the same in open position.

Referring to said drawings, 1 and 2 indicate two similarly shaped integral members formed from a single sheet metal blank, the same being doubled or folded at the lower front end thereof, as shown at the saddle portion 3, into approximately parallel relation and constituting a connector. The rear end portion 4 of said connector members, directly abut one upon the other and are designed to fit closely between the terminal loops 5 of the end link 6 of a chain and to be permanently attached to said link as by a headed rivet 7 directed through said loops and through holes 8 provided in said end portions. An upwardly and rearwardly directed notch or recess 9 is formed in the under side of each connector member 1 and 2 intermediate the ends of the latter, the same being adapted to receive therein a link 10 of the free end of the chain. The portions of said members 1 and 2 lying in front of their point of connection with the link 6 are spaced apart in parallel relation, providing an intermediate space 11 in which is mounted a lock or retainer designed to cooperate with said connector for retaining in place the link 10 when the latter is introduced in the recess 9, said retainer comprising a body portion 12 mounted upon a pivot-pin 13 carried by the members 1 and 2 below and in front of said recess. Said body portion 12 has a shape approximating that of the oppositely disposed front end portions of said members and has formed thereon a hook 14 which, in the lowered position of said retainer, is disposed in closing relation to the recess 9 for retaining the link 10 in the latter, as shown in Fig. 1. Forming a part of said retainer is an integral lever arm 15 which extends forward from the upper forward portion of the body 12 so as to occupy a position parallel to and closely overlying the adjacent link 10 of the chain. The forward end of said lever arm is preferably curved inward somewhat to occupy a position closely adjacent to, or within the embrace of the next link of the chain, as shown, thereby to obviate in a large measure the chance of its engaging objects by which the retainer would be swung to chain releasing position.

To further guard against chance release of the chain, a cotter-pin 16 may be introduced through registering holes 17 and 18 provided, respectively, in the members 1 and 2 and in the body portion 12 of the retainer, as shown in Fig. 2.

As a still further means of guarding against chance opening movement of the retainer, a notch-like recess 19 is provided at a suitable point in the upper edge of the body 12, and the upper front corners of the members 1 and 2 are inclined inward slightly to form small resilient tongues 20 which, when the closed position of the retainer is assumed, spring inward into said recess 19. While these tongues, so seated, offer but slight resistance to intentional opening movement of the retainer, they will ordinarily suffice to prevent chance opening.

It will be noted that the body 12 of the retainer, when in its retaining position, has that portion of the rear edge which is located above the hook 14 disposed substantially vertically. Due to the off-center location of the pivot-pin 13, when the retainer is swung to open position, the said vertical rear edge acts to thrust the link 10 out of the recesses 9 of the connector members and to cause said link to follow the hook 14 as the latter swings downward and forward to the position shown in Fig. 3, in which position removal of the link may be readily effected. Obviously, also, the retainer is positioned as shown in Fig. 3 when the ends of the chain are to be connected, and, following introduction of the link 10 in the hook thereof, said retainer is swung to its closed position, carrying said link into the recesses 9 of the connector.

What is claimed is—

1. A connector link for tire chains, comprising a pair of similarly shaped connector members disposed in spaced parallel relation and permanently connected at their rear ends to one end of the chain, each of said connector members having an upwardly and forwardly directed recess for the reception of a link of the opposite end of said chain, and a retainer pivotally mounted between the front end portions of said members, said retainer having a hook on its rear end for underlying the portion of the chain link which is received in said recesses and having a forwardly directed lever arm whereby it may be swung on its pivotal mounting for positioning said hook, the pivotal mounting for said retainer being located intermediate said hook and said lever arm.

2. A connector link for tire chains, comprising a pair of similarly shaped connector members disposed in spaced parallel relation and permanently connected at their rear ends to one end of the chain, each of said connector members having an upwardly and forwardly directed recess for the reception of a link of the opposite end of said chain, and a retainer whereby a link received in said recesses is held against withdrawal, said retainer being pivotally mounted on said members and comprising a body portion received between said members forward of said recesses, a hook formed on said body portion for disposal in underlying closing relation to said recesses, and an integral lever arm projecting forward from said body portion and closely overlying the chain, the pivotal connection between said retainer body and said connector members being located intermediate said hook and said lever arm, and means for guarding against chance opening movement of said retainer.

3. A connector link for tire chains, comprising a pair of similarly shaped connector members disposed in spaced parallel relation and permanently connected at their rear ends to one end of the chain, each of said connector members having an upwardly and forwardly directed recess for the reception of a link of the opposite end of said chain and a retainer whereby a link received in said recesses is held against withdrawal, said retainer comprising a body portion received between the connector members forward of said recesses, and pivoted off center to said members, a hook formed on said body portion and adapted in open position to receive a chain-link therein, and, upon closing movement of said retainer, to carry said link into said recesses, and a lever arm whereby said retainer is shifted to and from closed position, said arm being formed integral with said body and extending forward from said connector members into overlying relation to the chain, the pivotal mounting for said retainer being located intermediate said hook and said arm, and means for securing said retainer in closed position.

In testimony whereof we affix our signatures in presence of two witnesses.

IRVIN G. YODERS.
JAMES C. FILBY

Witnesses:
G. O. SMITH,
M. T. MARION.